US010970657B2

(12) United States Patent
Smith et al.

(10) Patent No.: US 10,970,657 B2
(45) Date of Patent: Apr. 6, 2021

(54) METHOD AND SYSTEM FOR CAUSAL ANALYSIS OF OPERATIONAL OUTCOMES

(71) Applicant: MOOD ENTERPRISES LIMITED, York (GB)

(72) Inventors: Simon Smith, York (GB); Simon Hodgson, York (GB); Mark Balmer, York (GB)

(73) Assignee: Hublsoft Group Limited, York (GB)

( * ) Notice: Subject to any disclaimer, the term of this patent is extended or adjusted under 35 U.S.C. 154(b) by 179 days.

(21) Appl. No.: 15/565,047

(22) PCT Filed: Apr. 7, 2016

(86) PCT No.: PCT/GB2016/050979
§ 371 (c)(1),
(2) Date: Oct. 6, 2017

(87) PCT Pub. No.: WO2016/162679
PCT Pub. Date: Oct. 13, 2016

(65) Prior Publication Data
US 2018/0101795 A1    Apr. 12, 2018

(30) Foreign Application Priority Data

Apr. 8, 2015   (GB) ..................................... 1505932

(51) Int. Cl.
*G06Q 10/06* (2012.01)

(52) U.S. Cl.
CPC ......... *G06Q 10/0631* (2013.01); *G06Q 10/06* (2013.01); *G06Q 10/067* (2013.01)

(58) Field of Classification Search
CPC ... G06Q 10/0631; G06Q 10/06; G06Q 10/067
See application file for complete search history.

(56) References Cited

U.S. PATENT DOCUMENTS

| | | | |
|---|---|---|---|
| 5,734,837 A | 3/1998 | Flores et al. | |
| 2001/0053991 A1* | 12/2001 | Bonabeau | G06Q 10/0639 705/7.17 |
| 2002/0188597 A1* | 12/2002 | Kern | G06Q 10/06 |
| 2006/0059028 A1 | 3/2006 | Eder | |
| 2008/0120129 A1* | 5/2008 | Seubert | G06Q 10/10 705/35 |
| 2008/0177592 A1* | 7/2008 | Masuyama | G06Q 10/04 705/7.36 |
| 2008/0195431 A1* | 8/2008 | Abe | G06Q 10/10 705/17 |
| 2008/0243912 A1 | 10/2008 | Azvine et al. | |
| 2009/0204267 A1* | 8/2009 | Sustaeta | G06Q 10/04 700/291 |

(Continued)

*Primary Examiner* — Sujay Koneru
(74) *Attorney, Agent, or Firm* — Head, Johnson, Kachigian & Wilkinson, PC

(57) ABSTRACT

The present invention relates to the creation of a method and system for the analysis of the operations of an organisation with regard to their achievement of organisation outcomes, by the generation of causal modelling systems and the implementation of the same in conjunction with a landscape model of the organisation. A visual generation system to allow user interaction with a display screen is also provided to allow the navigation of the properties of the organisation and outcomes within the organisation to be selected and analysed.

8 Claims, 15 Drawing Sheets

(56) References Cited

U.S. PATENT DOCUMENTS

| | | | |
|---|---|---|---|
| 2010/0169166 A1* | 7/2010 | Bateni | G06Q 30/02 |
| | | | 705/7.31 |
| 2013/0191187 A1* | 7/2013 | Ludwig | G06Q 10/06375 |
| | | | 705/7.39 |
| 2014/0019402 A1* | 1/2014 | Whittington | G06Q 10/00 |
| | | | 706/52 |
| 2014/0257924 A1* | 9/2014 | Xie | G06Q 30/0202 |
| | | | 705/7.31 |
| 2015/0286928 A1* | 10/2015 | Demiralp | H04L 67/10 |
| | | | 706/61 |
| 2015/0294256 A1* | 10/2015 | Mahesh | G06Q 10/067 |
| | | | 705/7.39 |
| 2016/0071031 A1* | 3/2016 | Daley | G06F 3/0484 |
| | | | 705/348 |
| 2016/0196587 A1* | 7/2016 | Eder | G06Q 30/00 |
| | | | 705/14.49 |
| 2017/0277738 A1* | 9/2017 | Danka | G06Q 10/063 |

* cited by examiner

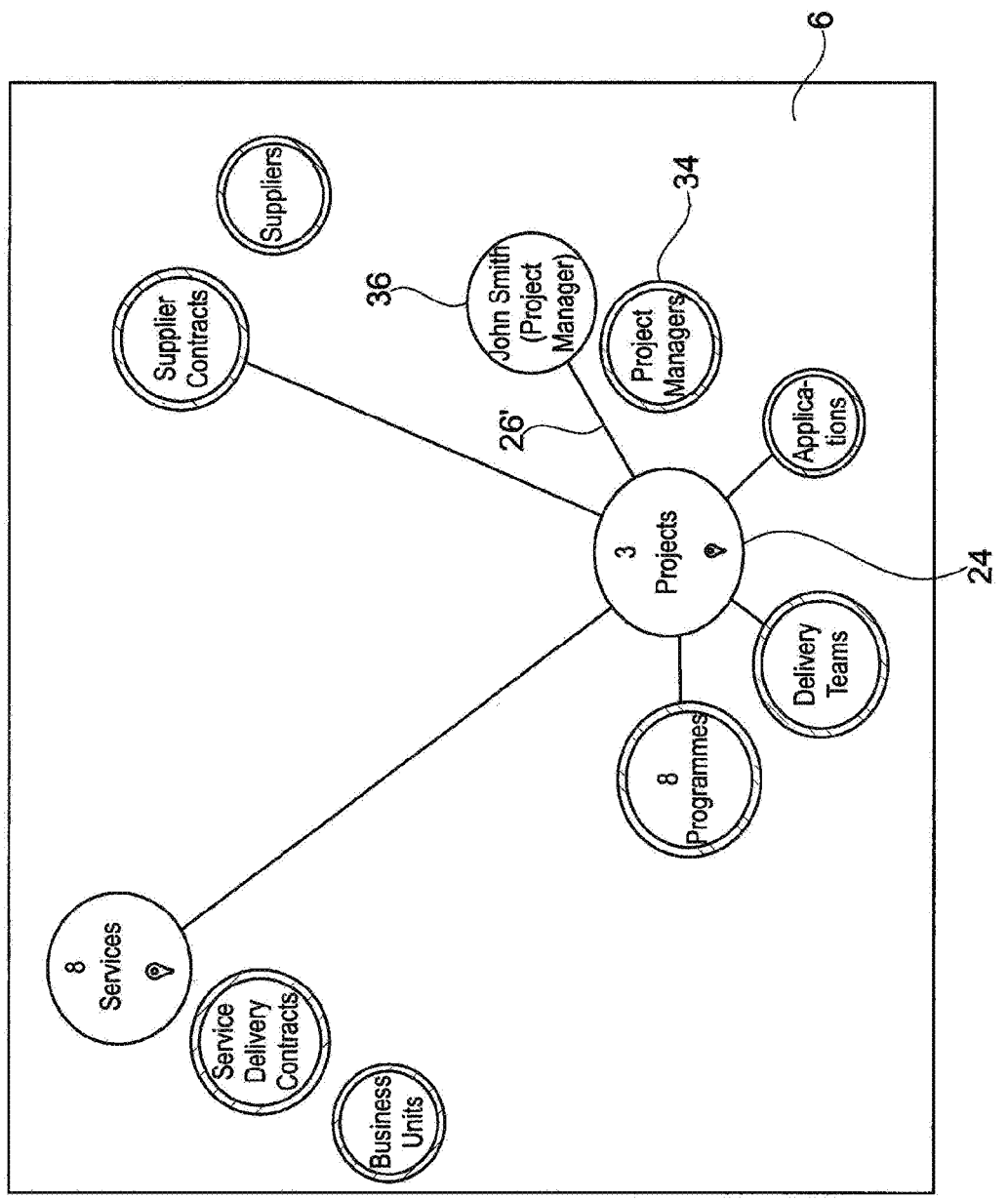

METHOD AND SYSTEM FOR CAUSAL ANALYSIS OF OPERATIONAL OUTCOMES

The present invention relates to the creation of a method and system for the analysis of the operations of an organisation with regard to their achievement of organisation outcomes, such as by the generation of causal modelling systems and the implementation of the same.

The following description includes references and an example to the generation of the method and system in use in a military context, and references and an example to the generation of the method and system in use in a commercial organisation context and the person skilled in the art will appreciate that the present invention can be applied to many different fields, projects and/or processes.

The visualisation and exploitation of causality connections between components of an organisation such as assets and/or capabilities, and other implicated components of the organisation situation, enables operators and decision makers to undertake reasoning and rationalisation and regarding outcomes that are, or could be, impacted by actions.

It is known to address this activity using conventional methods, one of which is to focus on representation of the organisation to support dialogue relating to the organisations. This form of system allows the representation to be delivered at, and with respect to, a point in time rather than with respect to the provision of a live system of support. Examples of these analysis techniques are strategy mapping, goal trees, Statistical Models which can be adjusted manually by the user with respect to a set of variables to relate the same to their business model and/or data visualisation techniques. A further problem with these systems is that the selection of content into the representation, and the selection of variables or parameters for manipulation in order to assess the appropriate action, is solely with regard to a dataset at a point in time, and/or the representation itself, leaving the user to make an implicit connection to the operational context under investigation. This problem can be exacerbated where the outcomes being addressed are outwith the scope of a single user.

Another conventional system is that which uses data-led techniques which focus on the analysis of data from business systems and the analysis or forecasting acts to aggregate the results which are obtained upwardly into outcomes. A problem with this approach is that other factors can, and most probably will, influence the outcomes that may only be captured through concepts which are not represented in the data and/or concepts which are drawn, for example, from experience. It can be the case that these concepts are of significance to the outcome but in the conventional approach they are not taken into account or may be subject to argument which leads to inefficiencies or impossibilities in reaching agreement on the best course of action.

A particular problem with the techniques that attempt to show or analyse the achievement of outcomes by business operations is that although the influence of certain assets or capabilities on other linked assets or capabilities can be shown by way of a diagram or chart, such an approach does not enable the user to visualise the projected consequential influence and/or changes in the influence over a period of time. Nor does such an approach enable prior identification and analysis of the likely potential of multiple threat and response scenarios, to inform planning, including taking account of any inherent time latency between invoking an activity and its effect being achieved. In addition, conventional techniques do not allow a user to analyse and/or simulate how one or more potentially occurring activities would be likely to affect the condition, state or status of organisation assets and capabilities over time and ultimately the outcome and success of a particular project or mission.

It is therefore an aim of the current invention to provide a method and system which can be used in relation to organisation operations that addresses the abovementioned problems.

It is a further aim of the present invention to provide a method for visualising the real state of an organisation with regard to what is actually achieving the outcomes.

A further aim is to provide a method for mitigating or transformational actions that can be selectively employed to bring about an improvement in the project or mission process outcome.

It is a yet further aim of the present invention to provide support to a wide range of business situations, including cyber situational awareness with respect to an organisation's assets and capabilities via the system or method.

According to a first aspect of the invention there is provided A method of performing the causal analysis of at least one outcome of an organisation with reference to an operating model including a causal model, wherein said method comprises the steps of:

defining at least one said outcome;

defining a path to the said at least one outcome, said path comprising a number of links and at least one property of the organisation operations, said at least one property derived from an operating model representing the concepts and properties of interest in at least part of the said organisation, said at least one property believed to influence the said at least one outcome;

connecting the said operating model to data showing current and previous states of factors of the organisation and selecting to use the same, when appropriate, as inputs to the causal calculations across the paths of properties for predicting the performance of the at least one outcome.

In one embodiment the organisation operating model context is adjusted through filtering and selection to show outcomes related to different parts of the business operations.

In one embodiment interventions are selectively made to make a structural change to the causal model through a prospective change to the business operating model, and hence to the properties being used in the causal model.

In one embodiment the said at least one property is identified as being believed to influence the said at least one outcome as a result of algorithmic analysis of data and/or drawing on experience of operations and/or the situation of the organisation.

The said at least one outcome and the influences on the same belong in an enterprise context and are derived from any, or any combination of, the properties of; the filtering and adjustment of context to modify the results being shown as outcome and/or as an aid to decision making via the organisation operating model which, contains connections to data to provide the varying values to the causal model.

In one embodiment the method includes the generation of an interactive visualisation of the organisation operating model to show the at least one outcome, and the properties implicated in the achievement of the outcomes, so as to provide a visual indication of the real organisation operating model and thereby illustrate the properties of importance that influence the achievement of outcomes.

In one embodiment the outcome can be selected via the display screen and properties causally linked to the outcome on the screen can be selected via the display to allow properties linked to the selected property to then be displayed. In one embodiment at least some of the further properties can be selected via the display screen to allow further properties lined thereto to be displayed, and so on to allow successive layers of the organisation operating model to be accessed.

In one embodiment a property which is displayed is not selectable but can be further analysed for potential causal influence using other techniques and/or resources which may or may not be visually identified.

In one embodiment the method includes the step of providing a causal model processing means which can be manipulated, such as by simulation of all potential interventions, to find an optimal balance between a plurality of potentially competing outcomes.

In one embodiment manipulation of causal model is performed using one or more automated analysis and search techniques, such as machine learning and/or Monte Carlo Tree Search techniques so as to reduce the requirement for human intervention in the construction and maintenance of the causal model, and/or the underlying organisation operating mode, and/or interventions that should be made to improve or adapt the at least one outcome. In one embodiment the said automated techniques are provided as an integrated part of the caudal model and accessible by the user via the causal model.

In one embodiment the method makes reference to a data repository and/or a historical store of data and/or a causal model processing means and/or a visual display.

According to a further aspect of the invention there is provided a method for the analysis of a project or mission outcome with reference to an organisation operating model, said method comprising;
 one or more paths leading to at least one outcome, said paths including one or more nodes representing a property of or related to the organisation and said nodes being connected with one or more causal links;
 populating the at least one outcome and/or property with data or information concerning the current, historical and/or future condition of the said property;
 and wherein the one or more conditions of at least the said at least one outcome are displayed or visualised to a system user at a common location via a user interface.

In one embodiment the properties linked with the outcome include condition data and the particular condition data utilised is selected with reference to the particular outcome to which the property is linked in a particular visualisation.

In one embodiment the condition value or condition type is changed or adapted with respect to the particular outcome to which the property is linked and which has been selected by the user.

Typically the causal links indicate which property nodes have an effect and/or influence on other or further property nodes. As such, the effect or influence a property of the organisation and represented by a node, has on a further property and/or outcome, can be shown or visualised.

In one embodiment the causal links are directional. As such, the extent of influence of the condition, state or status of each property is visualised, and shown as an outcome on related nodes and ultimately the influence and effect of the property nodes on the outcome is displayed and selectable to be further analysed.

In one embodiment it is the current condition of the property which is used in determining the effect of the causal link and so it will be appreciated that the impact of the causal link on a selected outcome may change over time.

In one embodiment each of the property nodes is displayed as a defined area of the display screen and at least some of the nodes may be divided into segments to indicate a particular feature of the condition of the property which is relevant to the outcome to which the same is linked at that time.

In one embodiment a graphical representation of an outcome which is available for selection shows the past, current and/or future condition, of the outcome.

In one embodiment the size and/or number of segments of the display for the outcome is indicative of the likelihood or probability of the outcome having a particular future condition.

In one embodiment a property and/or outcome can also be displayed as one or more charts. For example the current and previous condition of an outcome can be displayed as one or more pie charts, bar charts and or the like.

In one embodiment the current condition or status of a property and/or outcome is shown in real time.

In one embodiment the information concerning the condition of a property and/or outcome is represented with respect to past, present and future time intervals.

In one embodiment the properties and outcomes provided as part of the organisation operation model are time synchronised such that the causal flow and extent of influence both past, present and future condition is visualised.

In one embodiment the time or time period represented can be selected by the user or can be predetermined.

In one embodiment the condition or status displayed is updated when the data or information concerning the asset or capability changes. This change will also be displayed in other properties and/or outcome nodes with which there is a causal link.

In one embodiment the causal links indicate the presence of a number of conditional properties. Typically the conditional properties specify the way, or manner, in which the likelihood of each linked property being in a particular condition is dependent on the likelihood or probability of a connected property being in a particular condition.

In one embodiment the conditional properties of the causal links are determined from any, or any combination, of experience gained from experimental observation, data analysis and/or judgement.

In one embodiment the outcome condition includes any one or any combination of the chance or probability of the outcome being successfully completed, percentage completion and/or the like.

In a preferred embodiment the method includes the detection and representation of cyber activity and its potential impact on the operation or mission represented by the model generated in accordance with the method. The present invention is particularly useful for cyber situational awareness relating to an organisation in relation to which the method is implemented. In one embodiment the organisation is a military organisation.

In one embodiment the outcome is a military goal or target.

In one embodiment the condition or status of the properties and the asset or capability represented by the same, are characterised and/or categorised into at least one of a number of predefined conditions, ranks, ratings and/or the like. Typically the properties are rated according to the desired operational status of the same.

In one embodiment of the invention the user has the ability to set a particular value for a property. Typically the value is set when a user has observed that the property should be set at that particular value at the relevant time.

In one embodiment of the invention a particular value for a property is set according to a function that calculates that the property should be set at that particular value at the relevant time.

In a preferred embodiment of the invention the method includes the step of providing at least one mitigation path and/or property. Typically the mitigation path includes one or more mitigation properties connected by causal links. Further typically the mitigation properties represent at least part of an asset or capability that can be utilised to avoid or influence a property that falls below a predefined condition, status and/or standard. Typically the mitigation properties represent alternative assets or capabilities that can be used in combination and/or as an alternative to the properties and the assets and capabilities they represent.

In one embodiment mitigation paths and/or properties can be utilised in parallel to the existing paths. Thereby the user has the option to bypass or alternatively relieve the pressure on an underperforming or likely underperforming property and/or path.

In one embodiment the mitigation properties and/or causal links connecting the same are monitored but not visualised. Typically the mitigation paths are continuously updated but are run in the background and only fully visualised when selected.

In one embodiment at least part of the causal model or path can be run and/or scheduled to be run on user defined and/or selected value. Typically the user defined and/or selected values are assigned to nodes. Further typically the model can be run in a projection or scenario mode based on the user defined and/or selected values.

In one embodiment the causal links and/or property values include the implementation and/or are based on Bayesian reasoning. Typically evidence can be obtained at any point across the causal model, and the evidence used to provide reason to likely causes.

According to a further aspect of the invention there is provided a method for generating a causal model said method including the steps of generating;
  one or more paths leading to an outcome, said paths including one or more properties representing an asset or capability of an organisation and said properties connected with one or more causal links;
  said properties generated using data or information concerning the condition of the property; and
  at least one mitigation path and/or mitigation property representing at least part of an asset or capability that is selectively utilised to avoid or influence the operation of an asset or capability of the said organisation.

Typically the said mitigation path is implemented when the said asset or capability operation is below a predefined condition, status and/or standard.

In a further aspect of the invention there is provided at least one outcome connected via causal links to one or more properties provided on an interactive display to allow user interaction and selection of the outcome and/or properties to allow further properties to be displayed and analysed with respect to their potential impact on the condition of the said outcome.

Typically the said outcome and properties are displayed as nodes.

In a yet further aspect of the invention there is provided a system for performing the causal analysis of at least one outcome relevant to an organisation, said system including;
  an operating model including;
  a causal model in which at least one said outcome is identified;
  a landscape model including a plurality of properties of the organisation and links between the said properties;
  a database including data for the current and previous states of factors of the organisation and selecting to use portions of the data, when appropriate, as inputs to the causal calculations of the at least one outcome;
  video display generating means to generate a display indicating the properties as nodes and the links as line linking the nodes; and
  an interactive visual display on which the video display is generated and the display can be altered with reference to the user selection of a node to show selected property nodes and links which are relevant to the selected node;
  wherein a graphical display is generated on the interactive visual display to represent the at least one outcome and, upon user selection of the same, the properties and links from the landscape model which are identified as being relevant to the achievement of the outcome and which define a path to the said at least one outcome are displayed and allow user access, upon user selection of the said displayed properties, to the causal model for analysis of factors affecting the performance relevant to the said at least one outcome across the identified paths and properties.

In one embodiment a plurality of outcomes are available for user selection and the particular properties and links which are generated as a visual display are dependent upon the particular outcome which is selected by the user.

In one embodiment further properties and links are subsequently displayed upon user selection of a particular property from those which are displayed with respect to a selected outcome.

Specific embodiments of the invention are now described with reference to the following figures wherein:

FIGS. 1a-c illustrate part of a first embodiment of the invention showing the ability of the user to explore a landscape model part of the organisation operational model in accordance with the invention;

FIGS. 2a-c illustrate a second part of a first embodiment of the invention showing the manner in which the user can view and interact with a causal model part of the organisational operational model;

Figure 1A:
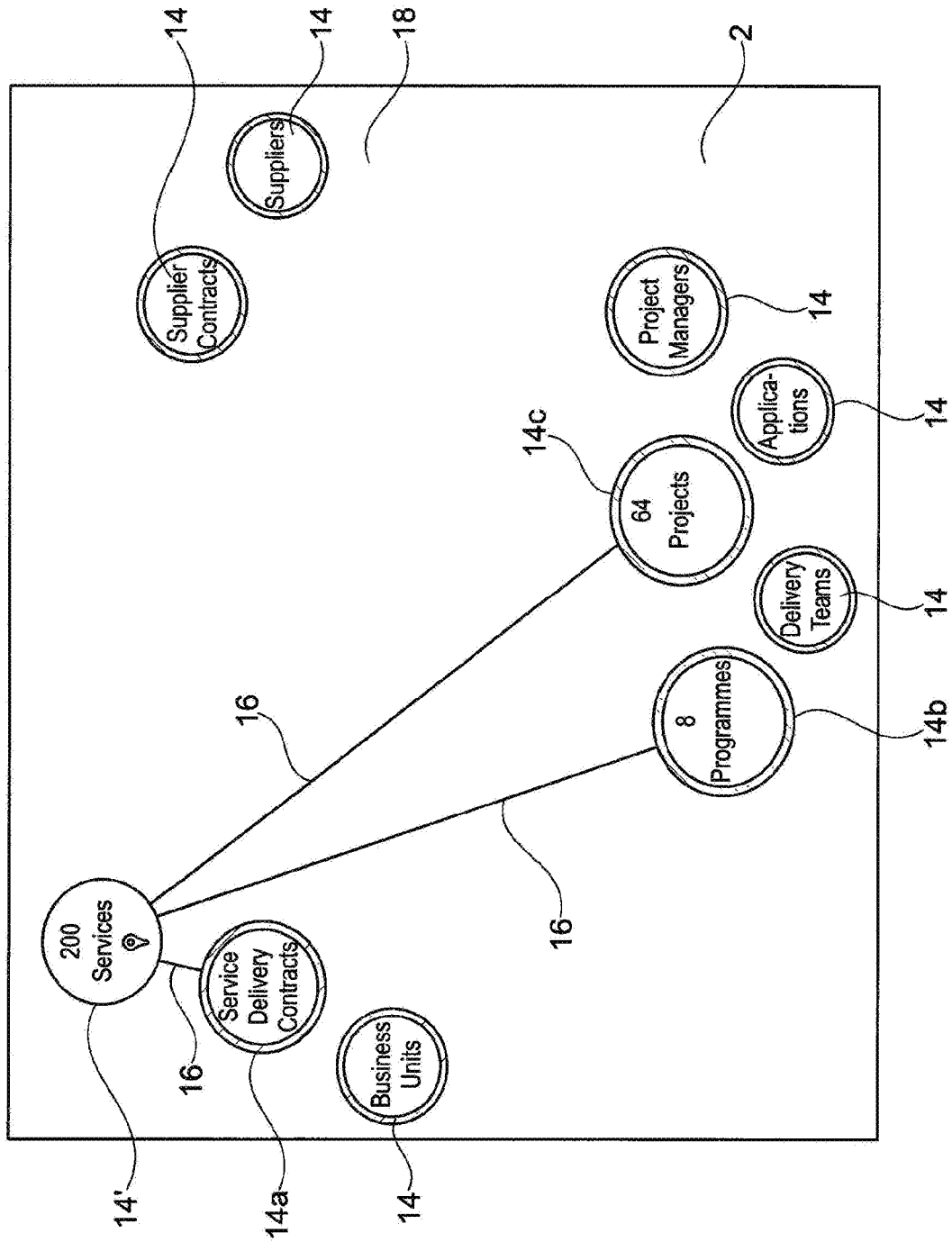
Figure 1B:
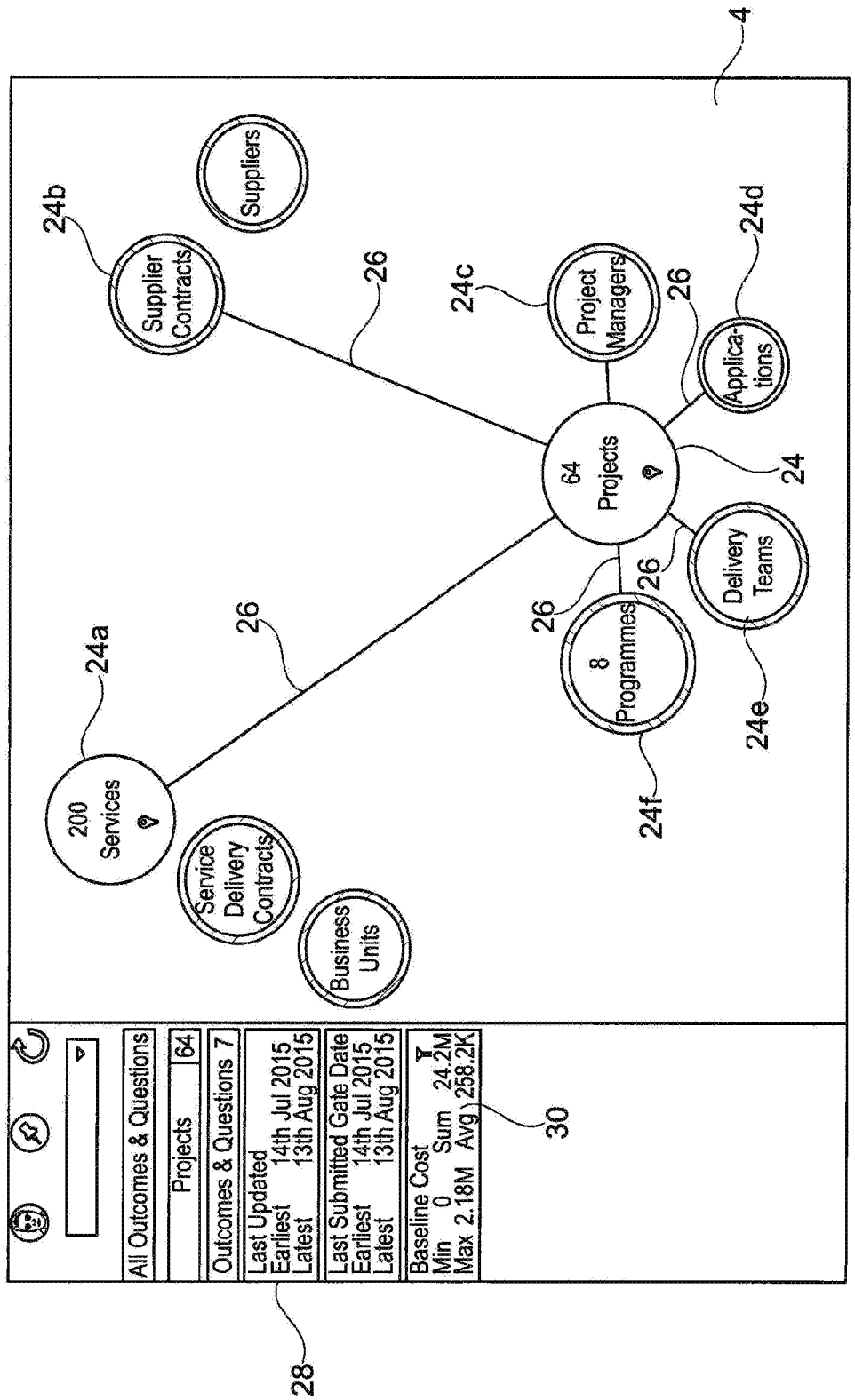
Figure 2A:
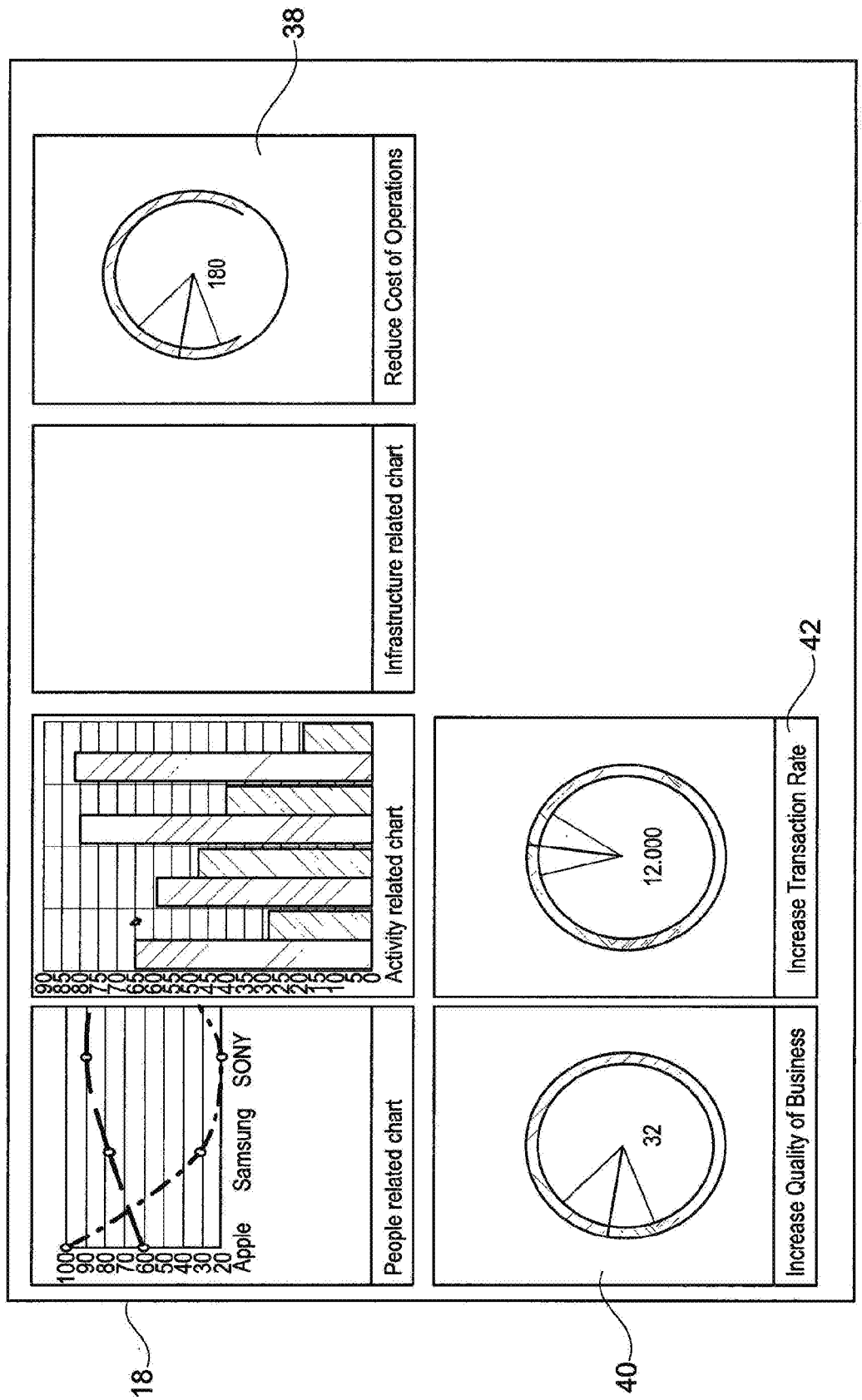
Figure 2B:
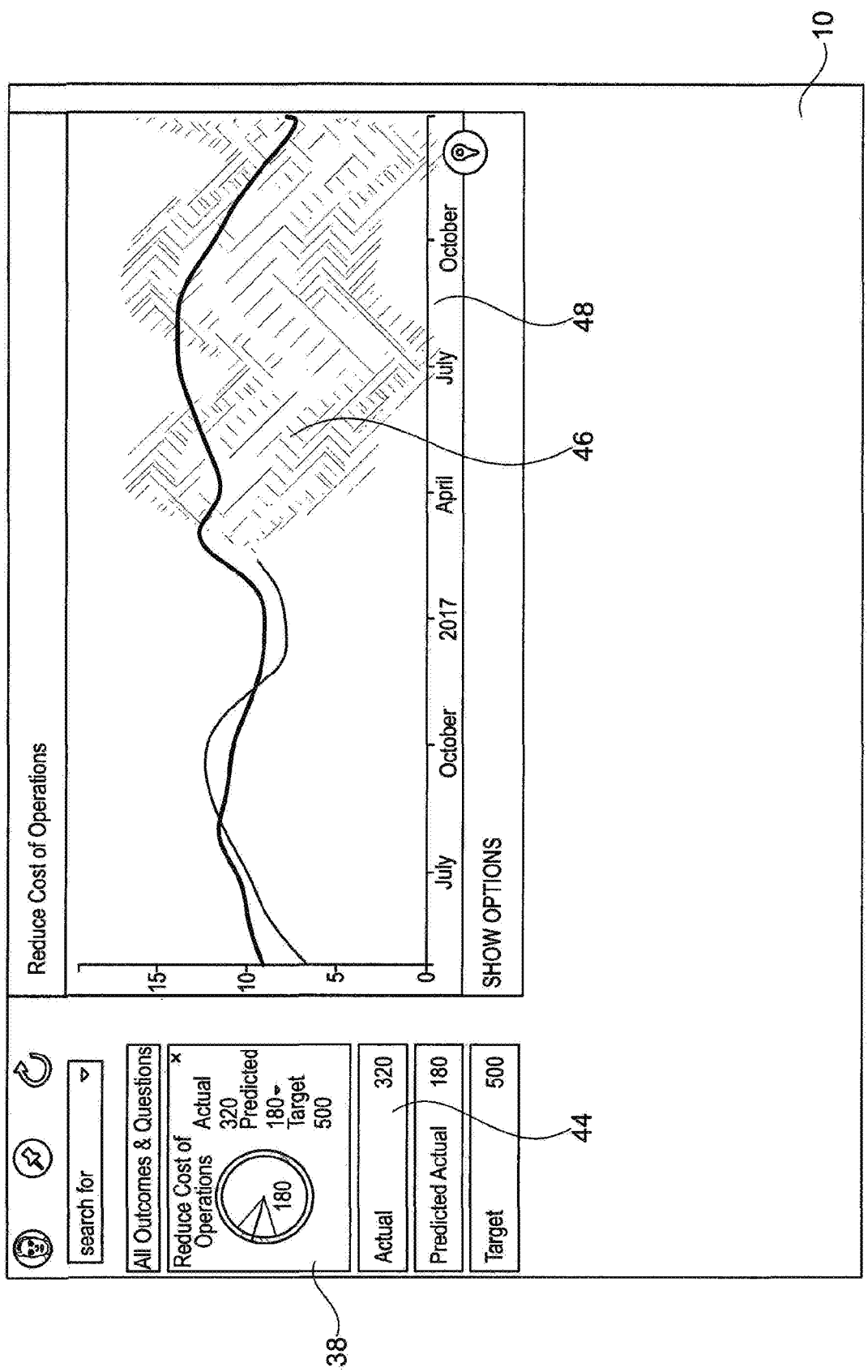
Figure 2C:
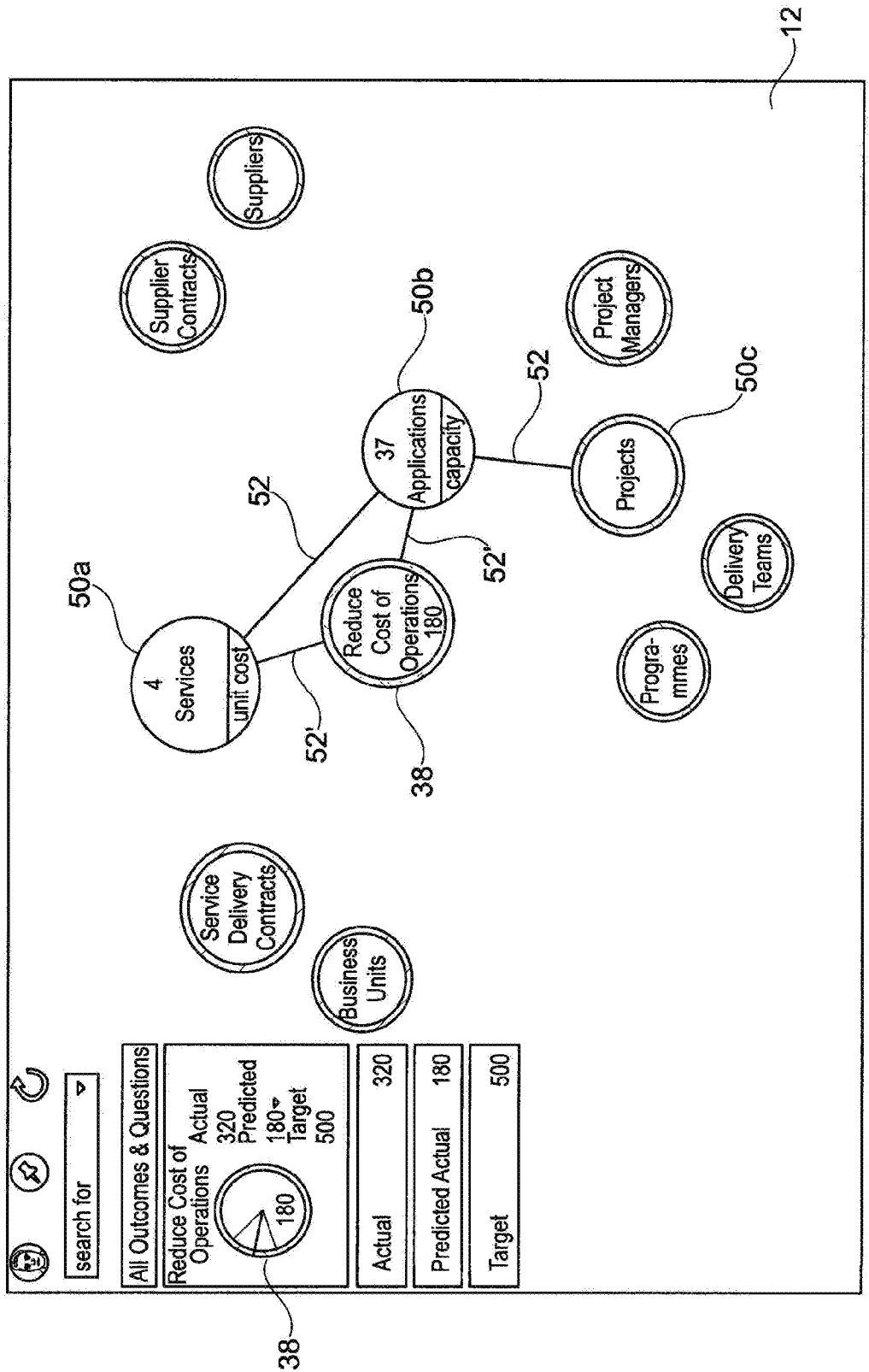

A first embodiment of the invention is illustrated with respect to the FIGS. 1a-c and 2a-c and these illustrate the manner in which the organisation operation model generated in accordance with the invention provides both a representation of the relevant properties of the organisation through the landscape model of FIGS. 1a-c and also through a causal model of FIGS. 2a-c in combination with the landscape model so as to indicate in a real time and predictive manner the way in which certain of the properties are linked to have an effect on a particular outcome of the organisation and how the causal links between the respective properties change with respect to a particular one of a range of possible outcomes which may be of relevance to the organisation and allow these to viewed and analysed at different levels of detail and granularity by user interaction with the displays. An outcome can be any identifiable factor which has an impact on the organisation and may relate, for example to service provision, costings, product manufacture, mission achievement or the like and will be relevant to the particular organisation.

The user interaction is typically provided in a form which enables the user to touch or place their hand at or over a property or outcome shown on the display screen and which then allows the properties and links which are relevant to that property to be displayed as a new display on the screen. The user can then select further properties to investigate further if they wish. This system therefore allows the user to navigate through the model and to be provided with information relating to the relevant properties and links which should be assessed with respect to particular outcomes of interest within the organisation.

In each of the visual representations of the model shown, displays 2-12 there are provided a series of properties 14 of relevance to the organisation which in this embodiment are illustrated as circles or nodes. The properties are identified upon initial analysis of the organisation when developing the landscape model of FIGS. 1-a-c and further properties may be added or removed subsequently. The properties 14 are linked by lines 16 as required and the particular links which are displayed on the display screen 18 at a given time will change with respect to the particular outcome which is selected by the user via, typically the interactive screen 18 by contacting the screen at a particular location. Thus the properties, and linkages between the same, which are identified as being of relevance to that particular outcome with respect to certain identified outcomes or aims are defined in the model. The linking and level of relevance typically can be identified using any or any combination of organisation data, knowledge within and/or external to the organisation. The links and relevance of the same can be adapted in real time as the model is utilised and/or internal or external conditions change.

An example of use of this embodiment of an organisation operation model in accordance with the invention is shown with regard to FIGS. 1a-c and FIGS. 2a-c as follows. In the FIG. 1a the user has selected the "Services", property 14' and this identifies in the property node that a total of 200 services exist in the organisation. The related properties 14a, 14b and 14c are indicated by the link lines 16 as shown in FIG. 1a.

In the FIG. 1b the user has selected the property "Projects" 24 and the properties which are linked to that with respect to "projects", properties 24a-f, are indicated and linked by lines 26 and how many of those match up with the Services property can be identified. In the display 28 on the left of the display screen 18, the Baseline Cost card has a filter icon 30 shown which indicates that the user has filtered the "Projects" property based on the Baseline Cost property so reducing the extent of the business operating model that is now within scope.

In the FIG. 1c it is shown that the user has further explored the landscape of the organisation operation model by selecting the property "project manager" 34 which is linked to the property "projects" and has identified a particular Project Manager (John Smith) 36 and added him to the illustrated landscape. The landscape illustration is then driven with respect to properties linked to that Project Manager 36 (for example, it is shown in the Project property 24 that John Smith is the Project Manager for three Projects). The link 26' shown in FIG. 1c is therefore redirected to the John Smith Property 36 rather than the general Project manager property of FIG. 1b. However as the remaining properties and links are still relevant to the projects property the other links 26 and other properties 24a-f of FIG. 1b remain in the same condition and this is controlled by the underlying model of the organisation and its properties and links between the same.

In addition to being able to visualise and identify the landscape of the organisation then in accordance with the invention the user is able to analyse the causal effect of links between the respective properties with respect to one or more particular outcomes. In order to achieve different outcomes, properties are linked to one or more outcomes in different configurations and with different levels of relevance depending on the particular outcome which is selected for analysis by the user. An embodiment of this is shown in FIG. 2a where there is shown a dashboard display 8 that contains a "health meter display" for three Outcomes relevant to the organisation: The outcomes in this case are: "Reduce cost of operations" display 38, "Increase quality of business"—display 40 and "increase transaction rate"—display 42.

Each of these outcomes are available for selection for analysis by a user by the user interacting with the display screen 18.

In the FIG. 2b the user has selected the Outcome 38 "reduce cost of operations" and is provided with a graphical display 10 of the current outcome value 44 and a forecast of the probabilities of future outcome values 46 with respect to a timescale 48.

In the FIG. 2c the selected outcome 38 is now assessed and analysed in conjunction with a display 12 linked to the landscape part as illustrated in FIGS. 1a-c, of the organisation operation model. The outcome 38 is shown as a property and the properties 50a-c which are linked to and relevant to the calculation of this outcome 38 are illustrated along with the causal links 52 between the same. In this example, the properties of "services" and "applications" can be seen to be direct causal links 52' and influences on the selected outcome 38. The user can then select the "services" and/or "applications" property nodes 50a, 50b to identify the links and properties connected to them and to generate further versions of the display to follow the chain of properties and links which are subsequently displayed and hence the further influences on the outcome. This can then be pursued to the level of detail that they desire and which is rendered accessible by the landscape model.

A further embodiment of the invention is now illustrated with respect to the causal model element of the organisation operation model for utilising the effect of cyber activity within the context of a "real world" outcome, so as to provide proactive and mission-focused support for cyber situational awareness, from the perspective of a person in control of the implementation of the mission or project. This model can be utilised in conjunction with a suitable landscape modelling as previously described.

Figure 3:
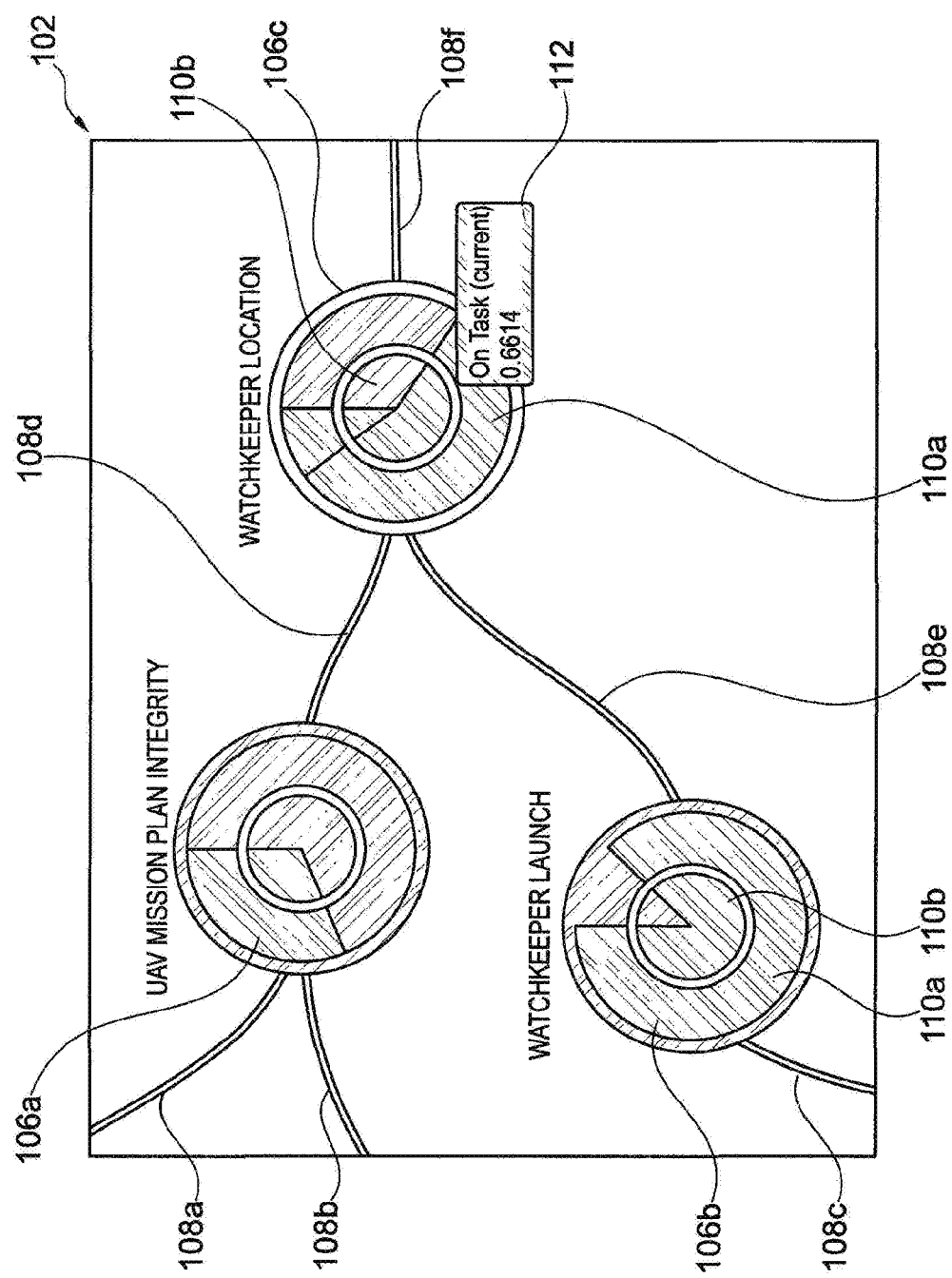
FIG. 3 shows an example of a further embodiment of an organisation operation model generated using the method in accordance with one embodiment of the invention.

FIG. 3 shows part of a causal model 102 for supply of a forward operational base. The visualised part of the mission path is represented or visualised by a path 104 comprising the properties of concern and influence in the achievement of the outcome. The properties are represented by nodes 106a-106c. The state, condition or status of the properties can be visualised, in this example, in the form of a pie chart. Each segment in the pie chart represents one of the states of the property, and the size of the segment, with respect to the other segments in that line indicates the likelihood on a scale from 0 (no likelihood) to 1 (absolute certainty).

In FIG. 3 it is illustrated how the user can see the condition, state or status change through time as there is provided a view of the current state 110a, and the previous state 110b, at each node, through, in this example, the use of two concentric rings 110a, 110b in the 'pie chart' nodes 106a-106c. It will be appreciated that other visualisation techniques and in particular charts or graphs could be employed to visualise any change in condition. The outer ring 110a shows the value at that instant in time, while the inner ring 110b shows the value for a previous time period, as further indicated in FIG. 4. If the values have changed, then arrows also indicate the way in which the condition has changed i.e. whether it has increased, or decreased, relative to a '12 noon' position.

FIG. 3 also shows the further detail 112 that is revealed by hovering over a particular segment, in this example the "On Task" state of a WATCHKEEPER LOCATION 106c. This gives the exact likelihood indicated by the size of the segment. In this case the WATCHKEEPER is more likely than not (probability 0.5514) to be 'on task' i.e. at the required location for surveillance.

The causal model also shows that these properties 106a-106c are linked, by causal links 108a-108f, in a directed acyclic graph that flows left to right. The links indicate the presence of an underlying table of conditional properties that specify the way in which the likelihood of each condition is dependent, or not, on the joint likelihood of those that connect into it.

The two causal links 108d, 108e represented by connecting lines mean that 'the likelihood of my WATCHKEEPER being on task' represented by node 106c is determined in part by whether it 'has launched', represented by node 104b, but also in part by the 'integrity of its mission plan' represented by node 104a.

It is important to note that the relationships in these models are not 'state transition' or 'task flow', or 'data aggregation', but are causal influence relationships which indicates, on basis of experience gained from experimental observation, data analysis or domain expert judgement, a directed causal dependency between properties. Furthermore, the causal links enable reasoning about how outcomes are, or could be, impacted by actions With regard to FIG. 4, the WATCHKEEPER asset is now confirmed as being 'In The Air', and, as a result, the likelihood of it being 'On Task' has increased. The inner ring 110b shows the previous likelihood of the WATCHKEEPER being 'On the Ground'–0.14. This likelihood has now dropped to 0, since it is certain that it is now 'In the Air'. These changes can also be seen in the summary table 114 showing how these likelihoods have changed since the previous time period.

Figure 4:
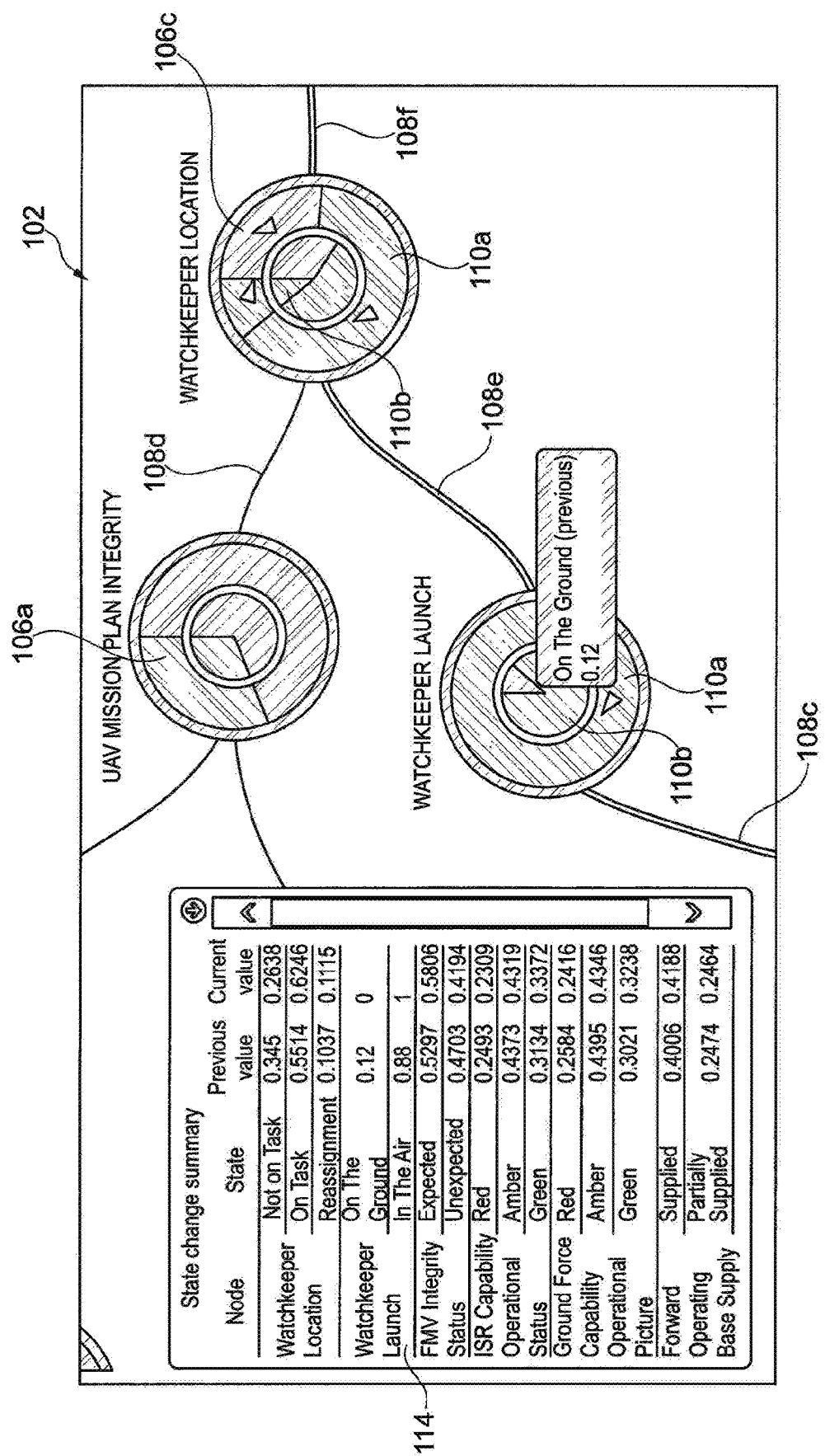
FIG. 4 illustrates how the model of FIG. 3 can be used to provide information concerning the current and previous likelihood of a property being in a particular state.
Figure 5:
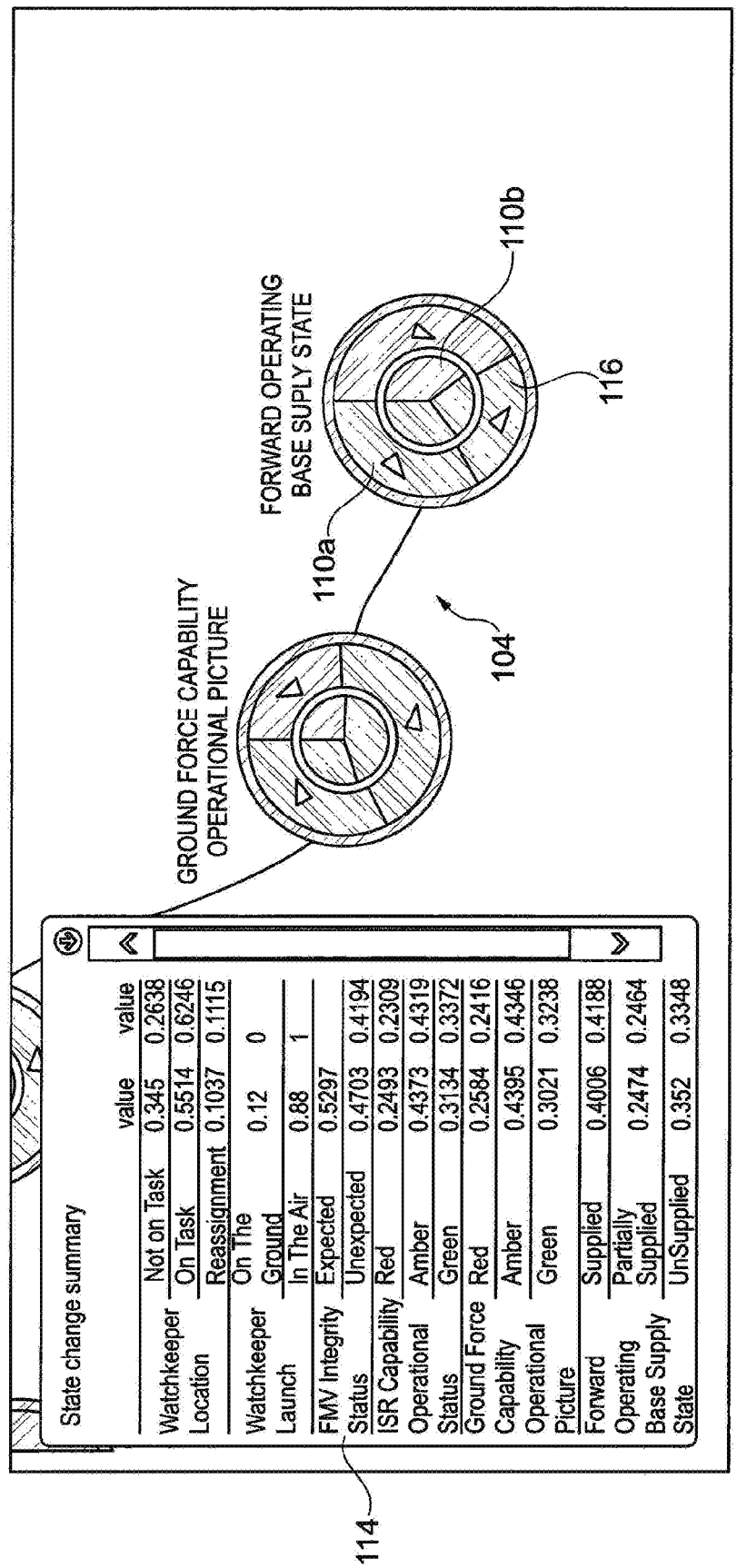
FIG. 5 shows an embodiment of an outcome in accordance with one embodiment of the invention.

The example in FIGS. 3 and 4 show some of the decisive conditions and hence node requirements in a path 104 and which at it's end has an outcome node as shown in FIG. 5, with the achievement of an outcome, in this case, completing the re-supply of a forward operating base, represented by the outcome node 116.

Figure 6:
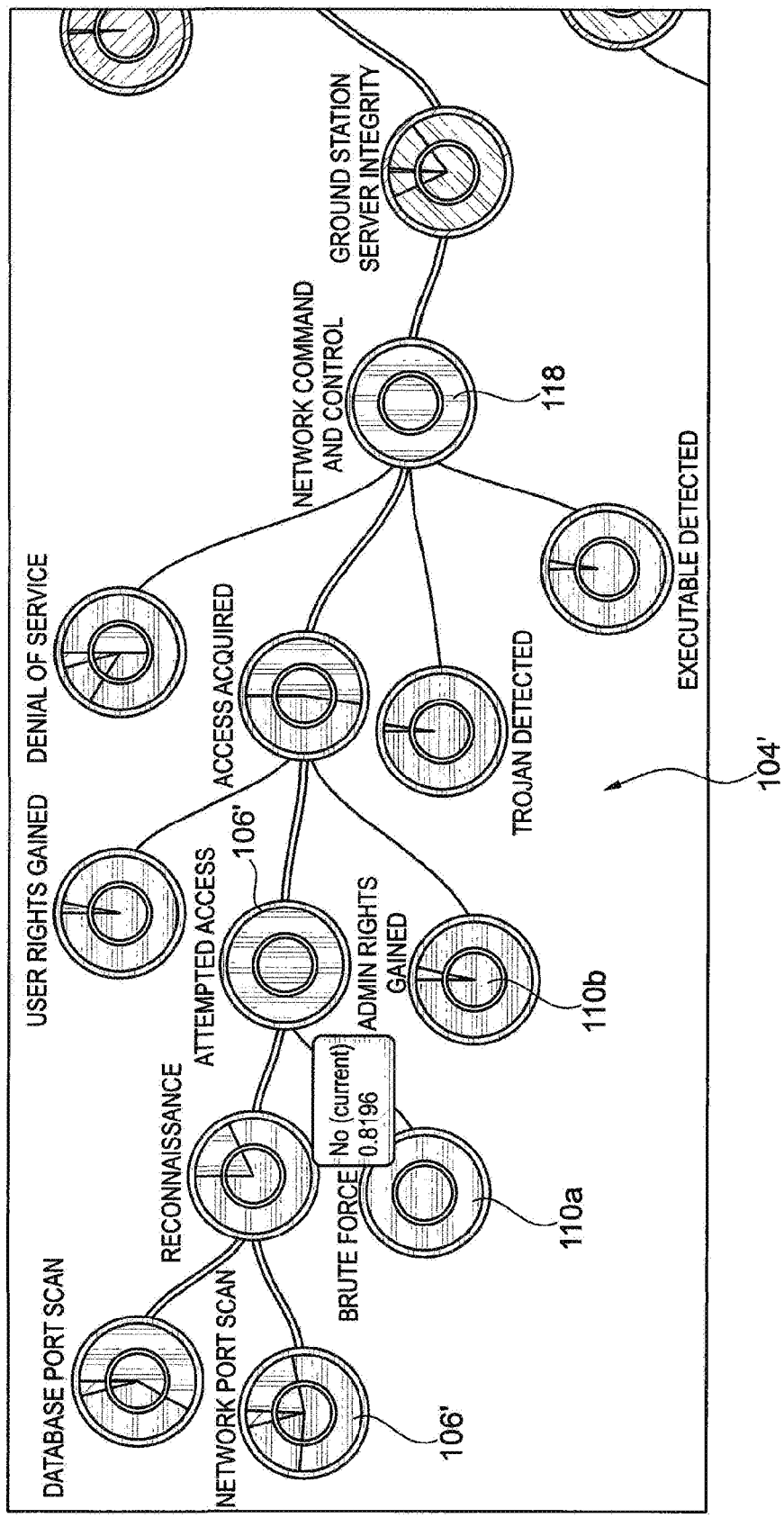
FIG. 6 shows a representation of a path leading to an outcome in accordance with one embodiment of the invention.

FIG. 6 shows a further path 104' showing a collection of nodes 106' which are relevant to an adversary 'kill chain'. Analogous to the outcome path 104, these nodes and the properties represented by the same, build to achieving a particular state of interest which, in this case has the objective of gaining command and control of a network as represented by the outcome of adversary termination node 118 which is to obtain network command and control.

Figure 7:
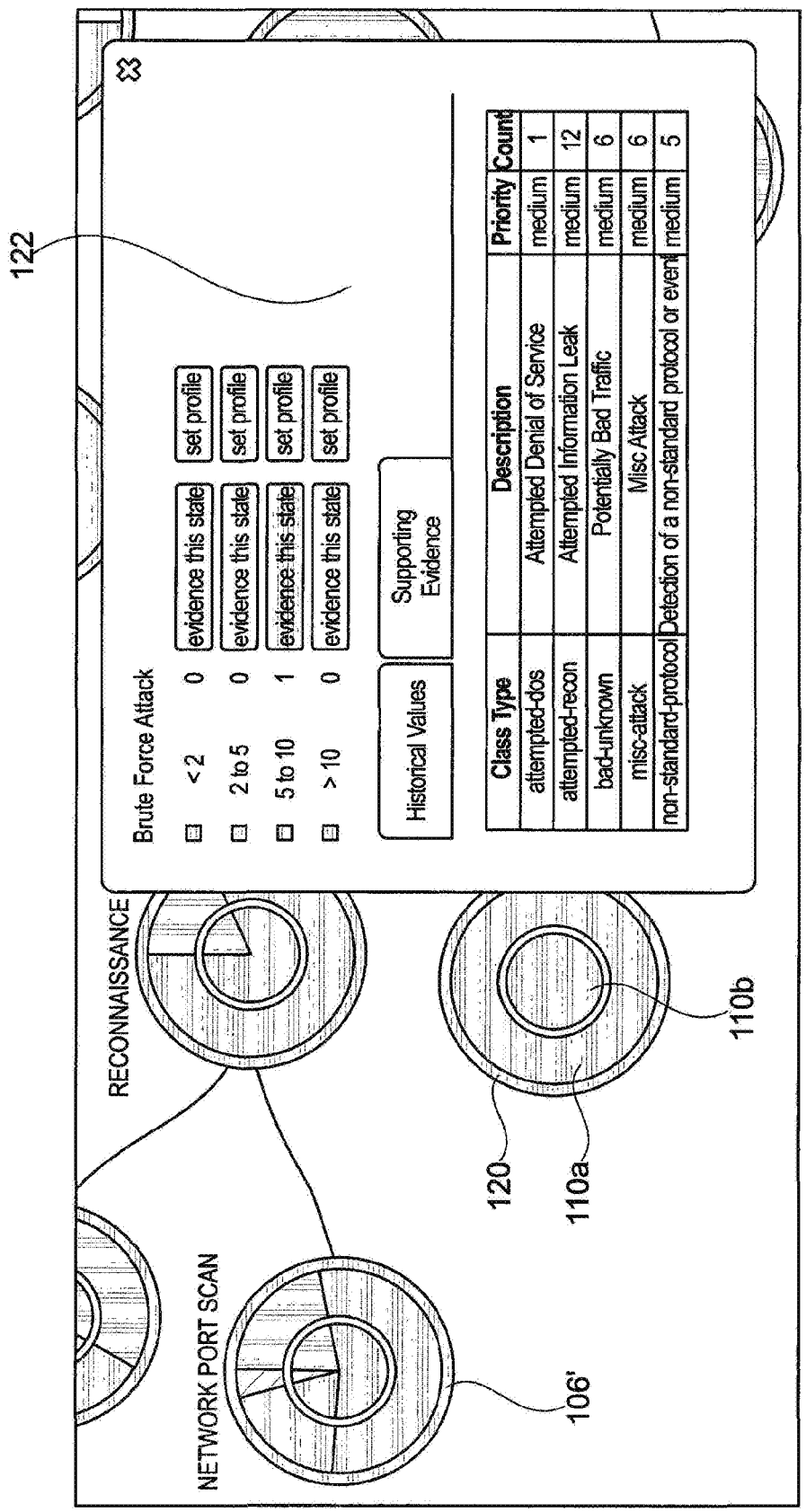
FIG. 7 shows how evidence can be manually inserted into a property node in accordance with one embodiment of the invention.

Supporting evidence for a node 106, 106' being in a particular state comes from underlying systems and FIG. 7 shows an example in which evidence for a Brute Force Attack (represented by node 120) taking place on a network is being monitored 122. The monitoring provides an update to this data when it occurs.

Also shown in FIG. 7 is the ability for a user to set a particular condition 'observe this state') 122. The updates to supporting data can also be mapped directly to the condition of a node 106, 106', without the manual intervention of a user considering this data and then setting a condition of a property.

Figure 8:
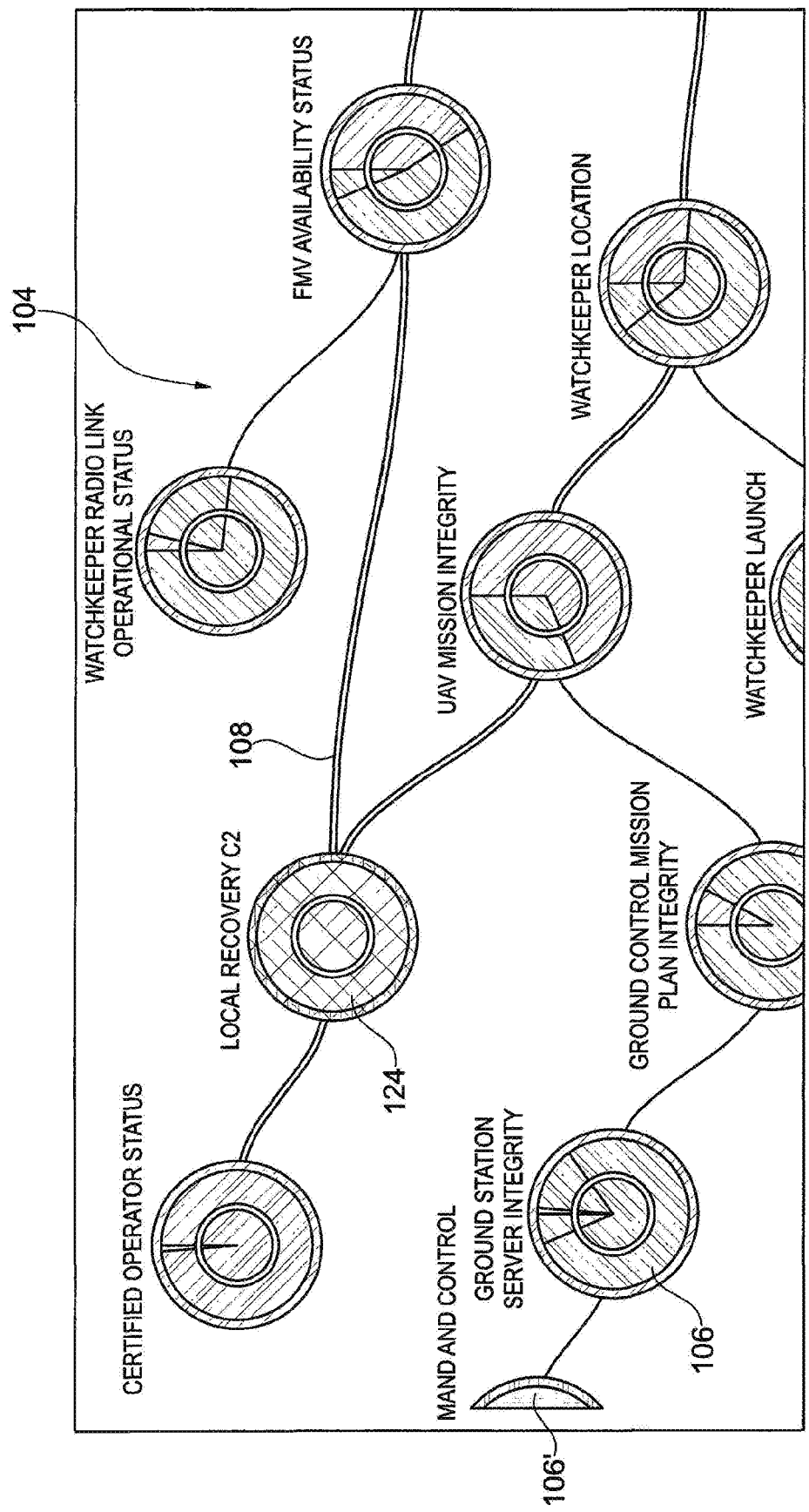
FIG. 8 shows an illustration of a mitigation property node in accordance with one embodiment of the invention.

As well as mission and adversary paths, a third kind of property is included in this embodiment which represents the result of an action that could be taken to influence likely outcomes downstream the path 104. These are mitigation paths or nodes 124 representing mitigating properties, as shown in FIG. 8.

Figure 9:
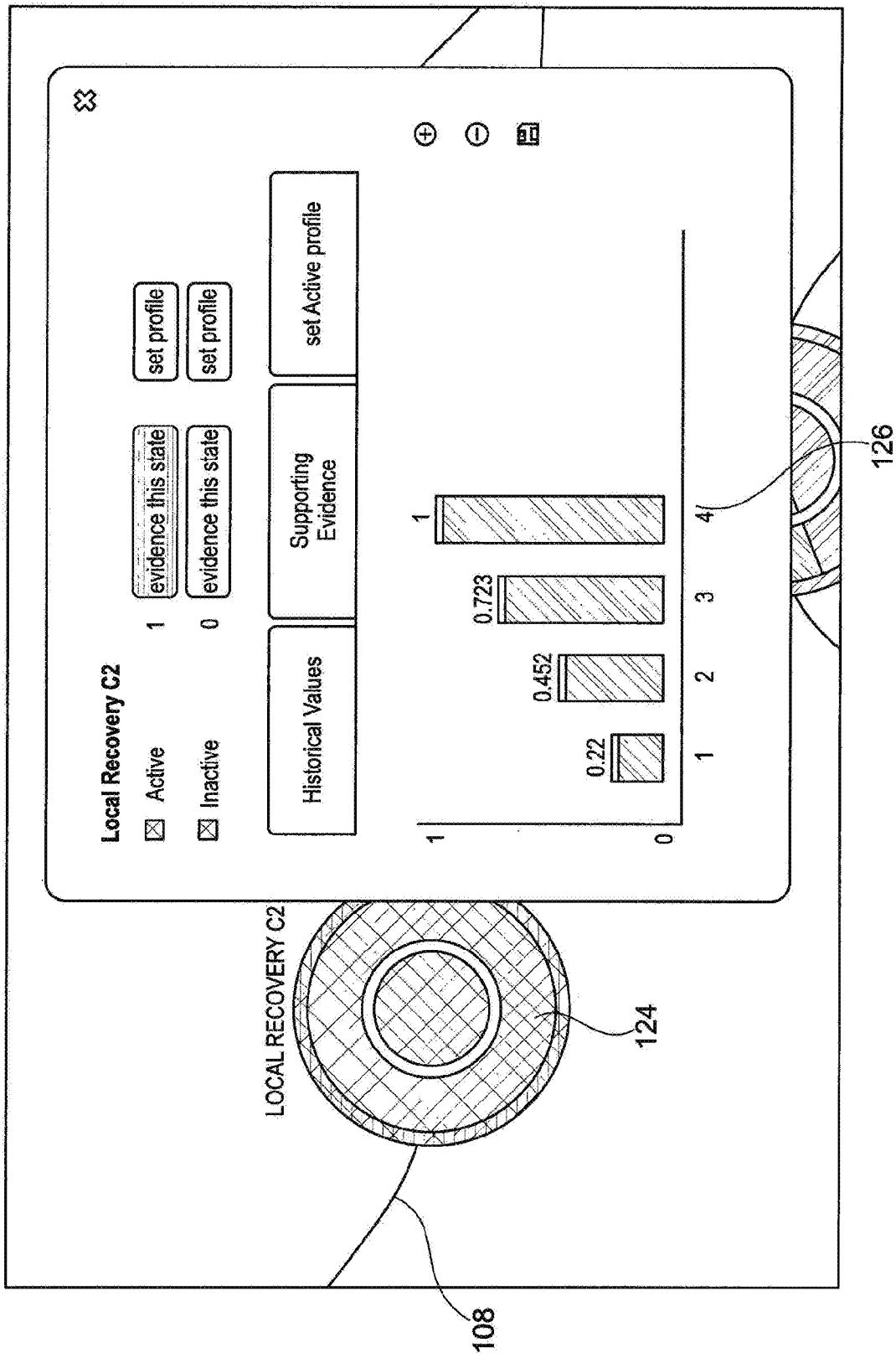
FIG. 9 shows a time profile property of implementing a mitigation property node in accordance with one embodiment of the invention.

A mitigation path or node is typically provided to be selectively utilised when a condition of one or more of the property nodes of the model path 104 is found to be below a predetermined condition. For example, an aim in the cyber kill path of FIG. 6 is to 'catch' an emerging kill problem earlier in the path so as to allow a lower cost and/or possibly cheaper mitigation to be chosen to achieve a desired effect. Typically several mitigations 124 are available at different stages across the model 102. The mitigation may require additional effort and/or time and this is therefore a significant consideration in choosing the appropriate mitigation and time of intervention and therefore a visualisation of the time profile 126 of a mitigation property is provided. FIG. 9 shows the time profile against a mitigation node 124 indicating how the likelihood of being in a particular condition increases over time, rather than being an instantaneous binary change. An "observation" facility is also available on a mitigation property or path, as shown in FIG. 9, in which case the "observation" is carried out as part of a 'what if' exploration.

A scenario mode is also available that allows a collection of changes to be anticipated at different future time points, with the effect being assessed by 'playing' the scenario through time, accounting for the anticipated actions.

Figure 10:
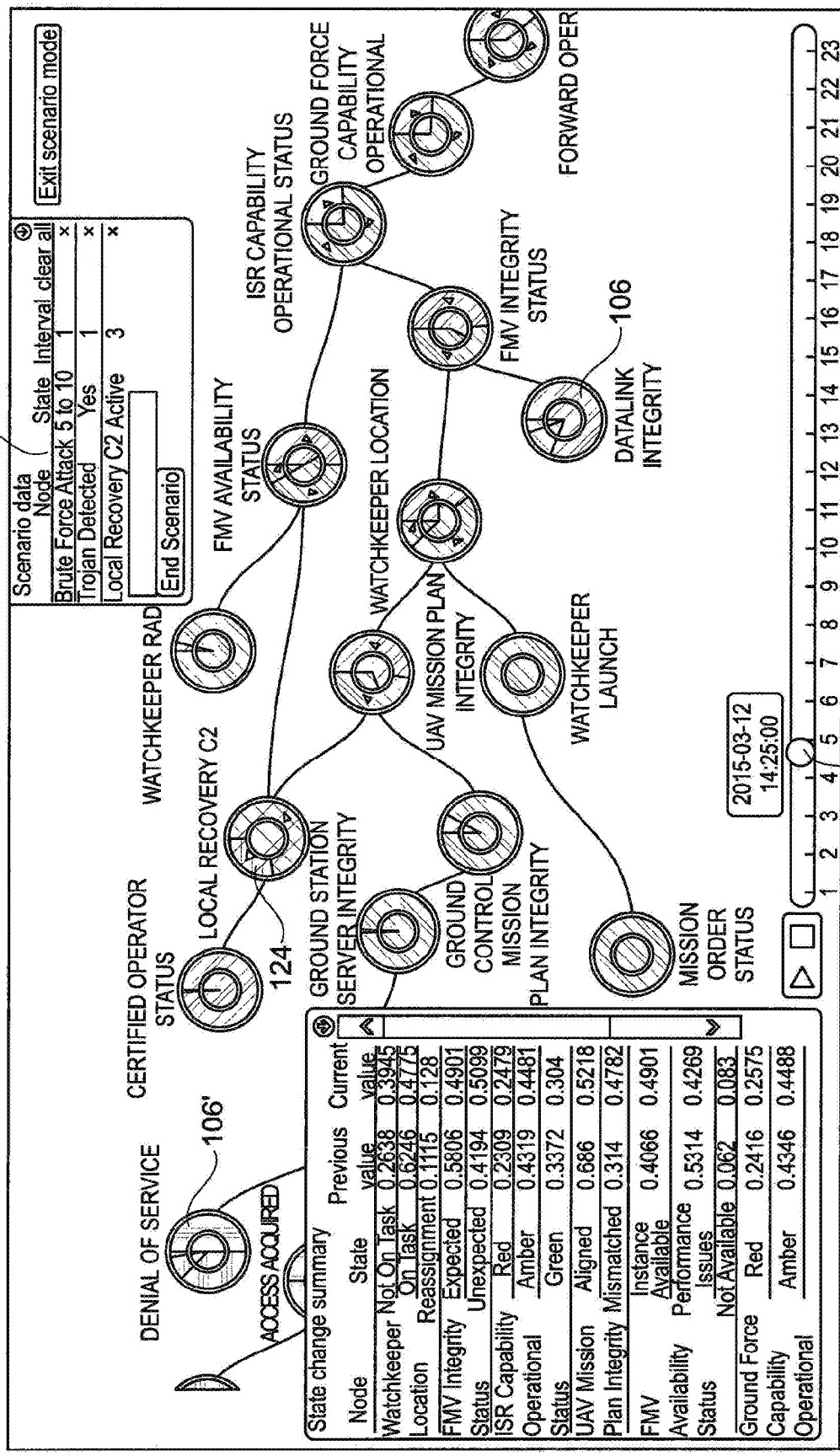
FIG. 10 shows a visualisation of a scenario mode for testing potential changes to selected properties and the effect on the outcome.

FIG. 10 shows a number of actions being scheduled (detailed in the 'scenario data' box 128) and shows the projected state of the outcome five hours after commencement, as illustrated on the time bar 130.

Figure 11:
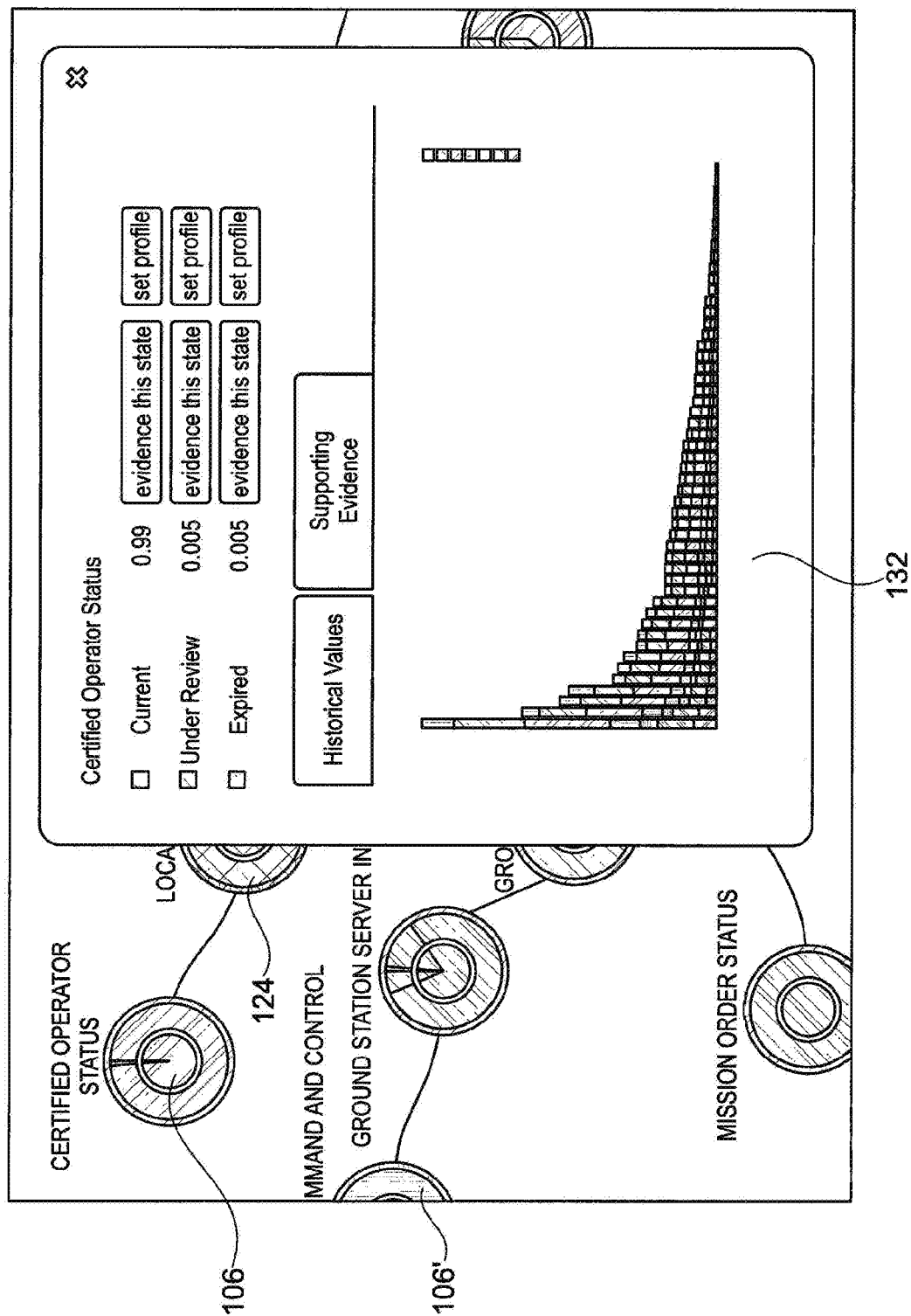
FIG. 11 shows an illustration of how roles can be accounted for in the application of a mitigation property.

Examples, or categorisations of assets which are required for an outcome can also be included and METS (Manpower, Equipment, Training and Sustainment) is one candidate. Consideration needs to be given to the roles that are required in order for a mitigation to be effective. For example, the likelihood of a mitigation being successful will be less if the associated manpower required for that mitigation is not available (or willing), as indicated at 132 in FIG. 11.

The underlying causal analysis may include an implementation of Bayesian reasoning so that, for example, evidence can be obtained at any point across the causal model 102, and the evidence used to reason about likely causes. A simple example is that given in FIG. 3, in which evidence that a WATCHKEEPER UAV 106c is on task strongly suggests that it has been launched, even if that evidence is not available.

A further example includes any property condition indicating that a particular cause is more likely than others. The state of supporting evidence might then be expected. If, for example, command and control of a network is indicated, even though no data for this was apparent, then further direction and instruction can be given to cyber analysts to investigate potential causes.

It should be appreciated that the steps described and performed and the above two embodiments of the invention can be interchanged and used in both, and other embodiments as appropriate to provide level of information and user interaction as required for a particular organisation for which the operation model is generated.

The invention claimed is:

1. A non-transitory system for performing the causal analysis of at least one outcome of an organisation tangibly embodying an operating model and a causal model, wherein said system comprises:
   data processing means for defining at least one said outcome of the causal analysis;
   a user interface in the form of a display screen by which the user may interact by placing their hand on or over a specific property or outcome displayed on the display screen, thereby defining a path to the said at least one outcome, said path comprising a number of links and a plurality of selected properties of the organisation operations, said properties selected from a larger number of available properties as a result of the said user interaction with said user interface and the data processing performed in the operating model as a result of the user interaction said available properties located within the operating model and representing the properties of interest in at least part of the said organisation, and identified in the operating model as believed to influence the said at least one outcome using organisation data, knowledge within the organisation and knowledge external to the organisation;
   a data storage facility connected to the said operating model to access data showing current and previous states of factors of the organisation and selecting to use the same as inputs to the causal model calculations used across the path of selected properties for predicting the performance of the user selected outcome and wherein the control means for the display screen generates a first visual representation of the outcome and path including said links and selected properties in response to the first user interaction with the display screen and generates further visual representations relating to the same outcome and the configuration of the said further visual representations is determined by user interaction with the display screen to select one or more of the properties displayed on the first or further visual representation displayed thereon at that time and;
   said causal model includes a time function to allow an outcome to be generated which is linked to the time function and data allocated on a time basis in the said database so as to generate on the display screen an indication of the current state of the outcome and a previous state of the outcome and wherein the said organisation operating model context is adjusted through filtering and selection to show outcomes related to different parts of the business operations and interventions are selectively made to make a structural change to the causal model through a prospective change to the business operating model, and hence to the properties being used in the causal model.

2. A system according to claim 1 wherein the said at least one property is identified as being believed to influence the said at least one outcome as a result of algorithmic analysis of data and/or drawing on experience of operations and/or the situation of the organisation.

3. A system according to claim 1 wherein the at least one outcome and/or properties linked to the same are derived from any, or any combination of, the properties of; the filtering and adjustment of context to modify the results being shown as outcome and/or as an aid to decision making via the organisation operating model which contains connections to data to provide the varying values to the causal model.

4. A system according to claim 1 wherein the method includes the generation of an interactive visualisation of the organisation operating model to show the at least one outcome, and the properties identified for the achievement of the at least one outcome.

5. A system according to claim 1 wherein at least some of said properties displayed on the display screen are available for user selection to allow properties linked to the selected property to then be displayed.

6. A system according to claim 1 wherein the method includes the step of providing a causal model processing means which can be manipulated, such as by simulation of all potential interventions, to find an optimal balance between a plurality of potentially competing outcomes.

7. A system according to claim 1 wherein the causal model links and/or properties are manipulated using one or more automated search techniques.

8. A system according to claim 7 wherein the said automated techniques are provided as an integrated part of the causal model and accessible by the user via the causal model.

* * * * *